Sept. 10, 1968     W. SCHNEIDER     3,400,764
AUTOMATIC DEPTH-CONTROL DEVICE FOR SOIL-WORKING IMPLEMENTS
Filed July 28, 1965     3 Sheets-Sheet 1
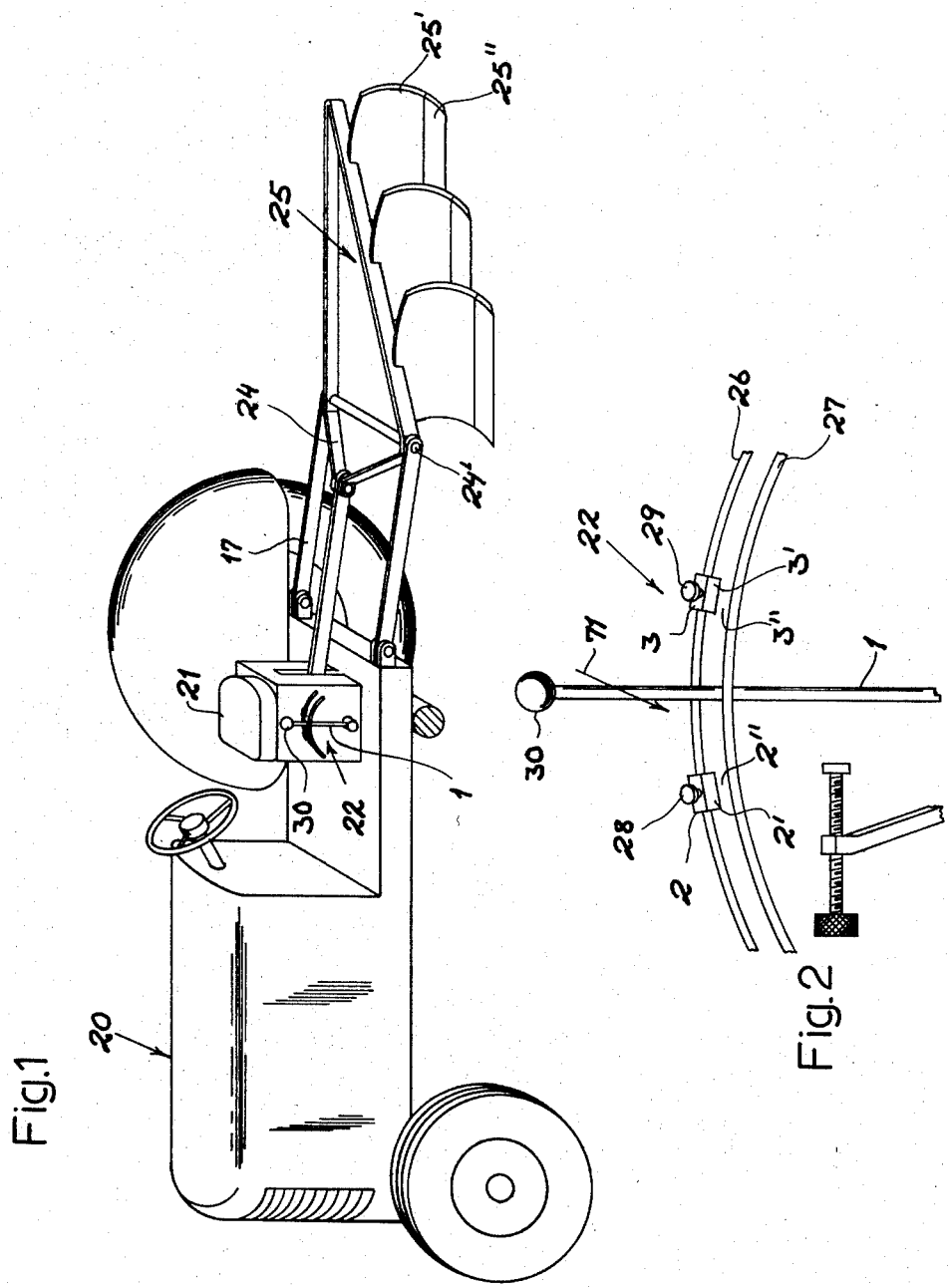
Walter Schneider
INVENTOR.
BY Karl F. Ross
Attorney

United States Patent Office 3,400,764
Patented Sept. 10, 1968

3,400,764
AUTOMATIC DEPTH-CONTROL DEVICE FOR
SOIL-WORKING IMPLEMENTS
Walter Schneider, Schonebeck (Elbe), Germany, assignor
to VEB Traktorenwerk Schonebeck, Schonebeck (Elbe),
Germany, a corporation of Germany
Filed July 28, 1965, Ser. No. 475,507
6 Claims. (Cl. 172—7)

ABSTRACT OF THE DISCLOSURE

An automatic depth-control device for a plow or other soil-working implement in which a lost-motion linkage is provided for the control member which actuates a main cylinder via a valve, the lost-motion stroke permitting the implement to rise and sink in accordance with soil conditions within a limited range without correction on the part of the control valve.

My present invention relates to elevatable and lowerable soil-working implements of the type adapted to be drawn by a tractor or other towing vehicle and, more particularly, to a control device or servomechanism for the automatic regulation of the depth of attack of the soil-working implement (e.g. a plow).

It is a common practice to mount soil-working implements designed to operate at different depths on an agricultural or other tractor with the aid of a hydraulic or pneumatic device for controlling the depth of the implement. The device is generally provided with a manually shiftable control lever having a plurality of predetermined positions corresponding to different implement depths at which the apparatus is settable. It has also been proposed to provide automatic depth regulation since plows or the like have a tendency to drive deeper into the earth when the resistance thereof to the movement of the plow decreases and, conversely, to raise when the soil resistance increases. Thus, to maintain a relatively constant depth of operation, servocontrol system have been provided with, for example, ground-engaging sensors and other mechanisms to compensate for variations in the depth of the plow and to maintain the desired operating conditions, as determined by the manually settable actuating element.

All such prior-art systems have, however, the significant disadvantage that the preselected positions of the plow are independent of the soil resistance to movement thereof so that, as the ground resistance increases, the strain upon the plow, upon its linkage with the tractor, and upon the motive source of the latter rises sharply. When the implement is to be displaced over extended distances of difficult terrains with high resistance to forward movement, the towing-force reserve of the tractor is often exceeded and the engine or gears of the latter are overloaded. Such overloading has, in the past, led to breakage of costly parts of the tractor-driving train as well as to damage of the plow and its linkage connection with the tractor.

It is an important object of the present invention to provide a control system or mechanism for the automatic depth regulation of a soil-working implement adapted to be towed by a tractor or the like which precludes overloading of the tractor, of the linkage between the tractor and the implement and of the implement itself.

A further object of this invention is to provide an improved automatic depth-controlling mechanism for an agricultural implement, such as a plow, which will permit the implement to compensate for changes in soil texture, density and resistance.

Another object of my inevention is to provide a readily adjustable and relatively simple depth-control mechanism capable of operation by the driver of a tractor for regulating the position of a soil-working implement.

These objects and others which will become apparent hereinafter, are attained, in accordance with the present invention, by providing an automatic depth-control device for a soilworking implement towed by a tractor, which comprises an actuating element shiftable by the operator of the towing vehicle, a control member engagable by this actuating element and forming a lost-motion linkage therewith but connected flexibly with a fluid-control valve, fluid-responsive means controlled by the valve for raising and lowering the implement, and means for preventing shifting of the valve member during relative movement of the control member and actuating element within the range defined by the lost-motion. Thus, this lost-motion stroke, which is adjustable according to the present invention, permits the implement to rise and sink in accordance with soil conditions within a limited range without calling for a correction on the part of the control valve and fluid-responsive means of the servosystem. The control element, advantageously, is flexibly linked with the valve by a linkage means which follows the movement of the implement so that, upon termination of the lost-motion stroke and immobilization of the control member upon its engagement with the actuating element in one of the extreme positions, further movement of the implement upwardly and downwardly beyond the level represented by this extreme position, will result in an actuation of the link means independently of further movement of the control member; the valve is then operated for compensating this further movement.

A system of this nature permits the automatic adjustment of the depth of a plow or other implement in accordance with the soil conditions and will prevent excessive strain on the system by raising the implement when, for a given towing force, the depth of the plow is excessive. The means for preventing actuation of the valve between extreme positions of the control member with respect to the actuating element can include a detent device at the valve and between the movable valve member and the relatively stationary housing. Moreover, the link means can be constituted as a rod pivotally secured to a double-arm lever forming the control member, the arms thereof being provided with a pair of abutments engageable with the actuating element in the relative extreme positions. At least one of the abutments is adjustably shiftable in the direction of the other to vary the lost-motion stroke, as indicated earlier.

According to another feature of the present invention, the actuating element can co-operate with a pair of relatively adjustable stops so that, upon movement of the control member in response to a change of soil conditions, the actuating element will be engaged and shifted until it is immobilized by one of the stops. It will be apparent, therefore, that with a predetermined lost-motion stroke of the control member with respect to the actuating element, the positions of the stops for the actuating element determine the upper and lower limits of the working depth of the plow. Within the range of implement depths determined by the lost-motion stroke, the depth of the plow is dependent upon the towing force and speed and the soil condition.

The above and other objects, features and advantages of my present invention will become more readily apparent from the following description, reference being made to the accompanying drawing in which:

FIG. 1 is a perspective view of a tractor towing an implement and provided with the control system of the present invention, parts being broken away to show the actuating element:

FIG. 2 is a fragmentary perspective view of the actuating element illustrating the adjustable-stop arrangement for the element.

Figure 3:
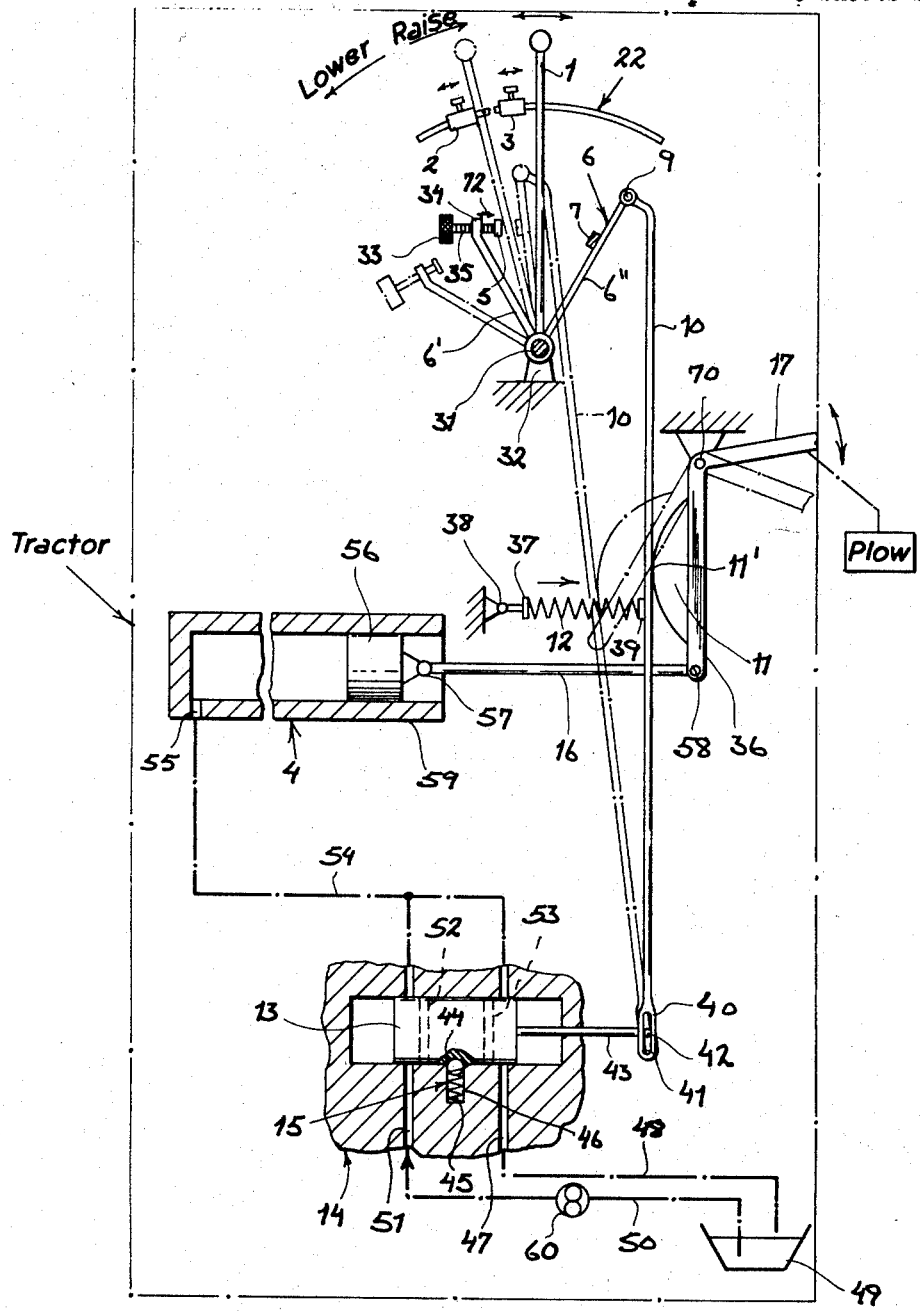
FIGS. 3 and 4 are somewhat diagrammatic elevational views of the control mechanism for the apparatus of FIG. 1 showing the basic parts thereof in different positions.

The control system of the present invention can be used in conjunction with a conventional agricultural tractor 20, one of whose rear or driving wheels has been shown removed in FIG. 1 to reveal the actuating means 22 of the control system disposed generally in the region of the seat 21 for the operator. The actuating means 22 comprises a rod 1 whose knob 30 is engageable by an operator in his normal driving position on seat 21. The usual three-point linkage, generally designated 24, connects a plow 25 to the tractor at its towbar 24'. The plow is also of any conventional type and can comprise the customary support frame carrying the moldboards 25' and shares 25'' of a plurality of plows. A hydraulic system is provided for raising and lowering the plow by means of a lever 17 pivoted at 70 to the tractor body. The hydraulic means is shown diagrammatically in FIGS. 3 and 4. From FIG. 2 it can be seen that the actuating rod 1 is guided between a pair of arc segments 26 and 27 mounted adjacent the seat and carrying a pair of stops 2 and 3. These stops are shiftable along the arc segment 26 and can be locked in place by screws 28 and 29, respectively, to define limiting positions for the rod 1 when the latter is disposed between the stops. The laterally projecting portions 2' and 3' of the stop members form a respective clearance 2'' through which the rod 1 can be passed when it is deflected laterally in the direction of arrow 71. Normally, however, the rod 1, which can be inherently resilient to allow such deflection, rests slightly against the arc segment 26 and thus positively engages the stops 2 and 3 when it is shifted to its extreme counterclockwise and clockwise positions, respectively.

Figure 4:
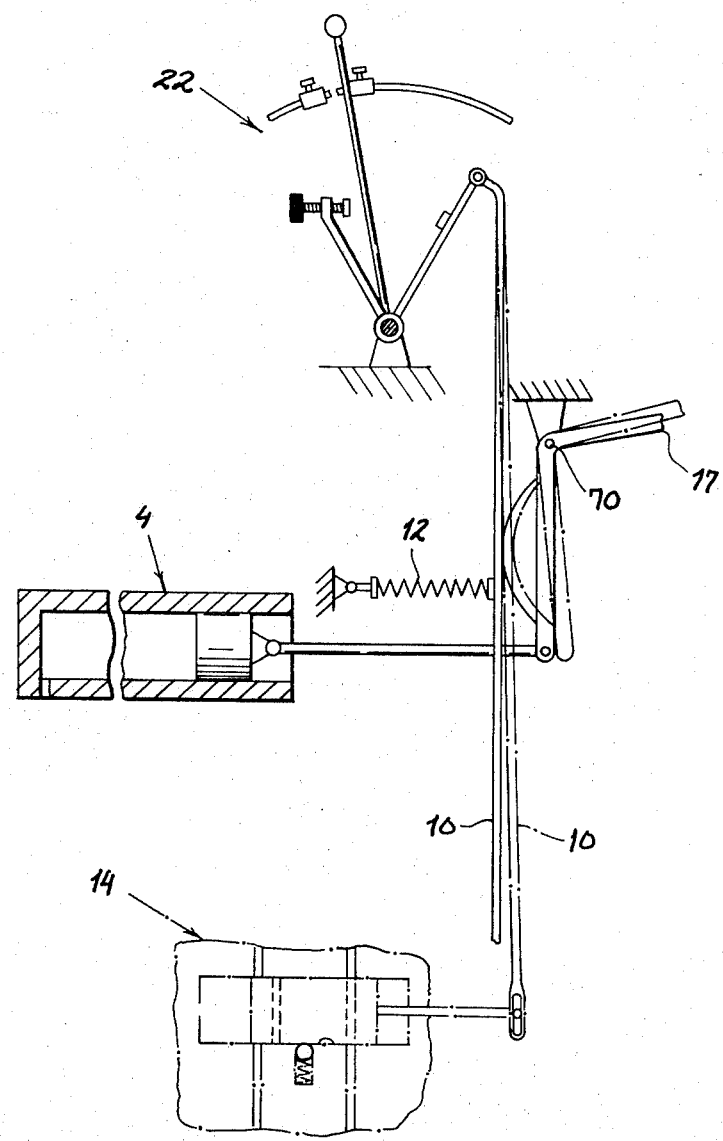

Referring now to the control system as seen in FIGS. 3 and 4, it will be observed that the rod 1 is swingable in the clockwise or counterclockwise senses about a pivot shaft 31 secured at 32 to the vehicle body. In the solid-line position of rod 1 (FIG. 3) the rod is shown beyond the stop 3 and, by lateral deflection of the rod, as indicated earlier, can be moved through the gap 3'' into the region between the stops. The actuating element or rod 1 co-operates with a control member 6 constituted as a double-arm lever. One arm 6' of this lever is provided with an abutment 5 adjustable in the direction of arrow 72 toward and away from a further abutment 7 carried by the arm 6''. To effect such adjustment, the abutment 5 is formed on a bolt 35 threaded into a nut portion 34 of the arm 6' and provided with a knurled head 33. Abutments 5 and 7 are each engageable with the rod 1 in extreme relative positions of the lever 6 and the rod; the lever 6 is swingable about the pivot 31 independently of the rod 1 intermediate engagement of the rod with the abutments.

Arm 6'' is articulated at 9 to a bar 10 of the link means, this bar 10 having an extremily 41 remote from the control member 6 and provided with a longitudinally extending slot 40 in which the pivot pin 42 of a valve rod 43 is received. Rod 43 controls the valve member 13 of a valve means 14 which regulates the flow of fluid to and from a hydraulic cylinder 4. For this purpose, the valve member 13 is provided with a pair of axially spaced bores 52 and 53 communicating with bores 51 and 47 of the valve body in the left- and righthand positions of the valve member 13. In its intermediate or "neutral" position (shown in FIG. 3), both bores are closed and the valve member 13 is lightly retained against movement by a detent means 15. The detent means comprises a spring 46 which is received within a radial bore 45 of the valve housing and urges a ball 44 into a recess of the valve body 13. The bore 51 is supplied with hydraulic fluid from a pump 60 and a reservoir 49 via a line 50. The pump and reservoir can be those conventionally provided in agricultural tractors for operating of the fluid-responsive devices and systems. A line 48 connects the bore 47 with the reservoir 49. On the other side of the valve 14, the valve member 13 connects the bores 51 and 47 alternately with a line 54 which conducts hydraulic fluid to and from a port 55 of the cylinder 59 of the hydraulic- or fluid-responsive means.

A piston 56 is axially shiftable within the cylinder 59 and is pivotally connected at 57 with a piston rod 16, the latter being articulated at 58 to the arm 36 of the implement-lifting lever 17. The latter, as previously indicated, is pivotally mounted at 70 to the tractor body and is coupled with the plow. In order to enable the control member 6 to follow the depth thereof, the arm 36 of lever 17 is formed with an arcuate cam 11 whose point of attack 11' against the bar 10 is between a spring 12 and pivot 9 at least in the "neutral" position of the system illustrated in solid lines in FIG. 3. The spring 12 is affixed to a support plate 37 at its extremity, removed from the bar 10, the plate 37 being pivoted at 38 to the vehicle body. A bearing plate 39 is provided between the spring and the bar 10.

*Operation*

Assuming an extreme clockwise position of the control lever 6 corresponding to a raised condition of the implement out of engagement with the ground, for example, the plow can be lowered by shifting the lever from the solid-line position illustrated in FIG. 3, past the stop 3 into engagement with the stop 2. The rod 1 thus entrains the abutment 5 in the counter-clockwise direction about the shaft 31. The pivot 9 shifts to the left while the spring 12 is effective at its maximum lever distance (i.e. the distance between the point of attack 11' and the pressure block 39) to swing the lever 10 in the counter-clockwise sense about the pivot and thereby shift the connecting rod 43 and the valve member to the right. A communication is thus established between the bores 47 and 53 on line 54 to permit hydraulic fluid to drain from the cylinder 59 under the weight of the plow, so that the latter progressively lowers into the ground. During this lowering operation, the rod 1 rests against the stop 2 (dot-dash lines in FIG. 3) and the progressive downward movement of the plow swings the lever 17 in a clockwise sense about its pivot 70. Cam 11 rolls along the bar 10 which previously has returned the valve member 13 to its "neutral" position shown in solid lines in FIG. 3.

In this position, the valve member 13 is held by the detent 15 with a relatively light force and, since the point of attack 11' has shifted substantially into the region of the spring 12, there is no movement of the bar by the spring force. The bar 10 continues to swing about the pivot 42 under the action of the cam 11 until it attains its dot-dash-line position shown in FIG. 3 in which the abutment 7 engages the rod 1. Since the latter is immobilized against the stop 2, further movement of the actuating member 6 and the pivot 9 is not possible. Any additional lowering of the plow, beyond its lower operation depth as preselected by the position of stop 2 will result in a camming of the lever 17 of the bar 10 swing about the stationary pivot 9 and thus urge the valve member 13 to the left when the camming force exceeds the force necessary to trip the detent 15. Communication is then established between the bores 51 and 52 and the cylinder 59 so that the hydraulic fluid under pressure from pump 60 is supplied to cylinder 59 to drive the piston 56 to the right and elevate the plow until the "neutral" valve position is restored. This sets the lower limit of the plow depth independently of soil conditions and tractor towing force.

When, however, the soil becomes dense and resistance to the plow increases, there is a tendency of the implement to rise. The lever 17 thus swings about the pivot 70 in the counterclockwise sense and is followed by bar 10 which is held by spring 12 against the cam 11. Since the lower pivot 42 of the rod 10 is held stationary in the absence of a supervening force by the detent 15, the bar 10 swings the control member 6 in the clockwise sense until the abutment 5 bears upon the rod (solid lines in FIG. 4). The rod is then entrained by the abutment 5 in this sense until it engages the stop 3. When the rod 1 is thus immobilized, movement of the pivot 9 terminates the further elevation of the plow and causes the spring 12 to swing the bar 10 in a counterclockwise sense about pivot 9 to shift the valve 13 to the right and connect the cylinder 59 with the reservoir thereby lowering the plow, thereby restoring the upper limit of the depth range (see dot-dash position in FIG. 4).

To raise the plow entirely, the lever 1 is shifted clockwise, preferably past the stop 3, so that it engages the abutment 7 and swings the lever 6 to the right and bar 10 rolls along the cam 11 so that the valve member 13 is shifted to the left and hydraulic fluid is supplied under pressure to the cylinder 59. The supply of hydraulic fluid continues until the abutment 5 is brought to bear against the rod 1 and the cam 11 permits the restoration of the valve member 13 to its "neutral" position.

When the rod 1 is between the stops 2 and 3 and out of engagement with either of the abutments 5 or 7, the position of the implement is determined only by the nature of the soil and towing force. There is thus no need to adjust the towing force or tractor speed within this range of lost-motion nor is there any danger of overloading the system.

The invention as described and illustrated is believed to admit of many modifications within the ability of persons skilled in the art, all such modifications being considered within the spirit and scope of the appended claims.

I claim:

1. An automatic depth-control device for a soil-working implement mounted on a tractor and raisable and lowerable relatively thereto, said device comprising an actuating element shiftable on said tractor by an operator thereof; a control member movably mounted on said tractor and engageable with said element with lost-motion for displacement by said actuating element; fluid-responsive means for elevating said implement and including a fluid-control valve; link means connecting said control member with said valve for operation thereof upon termination of lost-motion between said control member and said actuating element, and means for communicating the motion of said implement to said link means for displacing same and said control member limitedly without operating said valve means, thereby permitting limited raising and lowering movement of said implement independently of said fluid-responsive means, said actuating element including a rod rotatable about an axis fixed on said tractor and said control member being a double-arm lever swingable about said axis and having a pair of arms lying on opposite sides of said actuating element in the plane of swinging movement thereof, said control member being further formed with a pair of abutments respectively on said arms for engagement with said actuating element in respective extreme relative positions of said element and said lever corresponding to the limiting positions of the lost-motion of said lever with respect to said element.

2. A device as defined in claim 1, further comprising adjusting means for one of said abutments for shifting same toward and away from the other of said abutments.

3. A device as defined in claim 1 wherein said link means includes a bar pivotally secured to said lever at one of said arms and one extremity of said bar, said valve means having a shiftable valve member coupled with said bar remote from said extremity thereof, said valve member having a first operative position, said fluid-responsive means including a fluid-pressure-operated cylinder coupled with said implement for raising and lowering same, said valve member having a first operative position in which fluid under pressure is supplied to said cylinder for elevating said implement and a neutral position in which the supply of fluid under pressure to said cylinder is blocked and upward and downward movement of said implement independently of the supply of fluid pressure is permitted, said device further comprising detent means for retaining said valve member under light pressure in said neutral position while said actuating element is disposed between said abutments without forceful engagement thereby.

4. A device as defined in claim 3 wherein said means for communicating the motion of said implement to said link means includes a further lever pivotally mounted upon said tractor and displaceable by said fluid-responsive means while being linked with said implement, and cam means carried by said further lever and bearing against said bar for shifting same upon termination of lost-motion of said control member relatively to said actuating element in either sense in a direction tending to operate said valve means re-establish a predetermined operating position of said implement as defined by said limiting positions.

5. A device as defined in claim 4, further comprising spring means bearing upon said bar between the region of attack of said cam means therewith and said valve means for holding said bar against said cam means.

6. A device as defined in claim 5, further comprising adjustable stop means engageable by said actuating element for retaining same against displacement by said coupling member.

References Cited

UNITED STATES PATENTS

| 2,721,508 | 10/1955 | Edman | 172—9 |
| 2,832,276 | 4/1958 | Heitshu | 172—9 |

FOREIGN PATENTS

| 24,280 | 11/1962 | Germany. |
| 62,731 | 4/1955 | France. |

ABRAHAM G. STONE, *Primary Examiner.*

J. R. OAKS, *Assistant Examiner.*